United States Patent [19]
Gerber

[11] Patent Number: 5,742,251
[45] Date of Patent: Apr. 21, 1998

[54] COMBAT HARNESS

[75] Inventor: Peter Gerber, Berikon, Switzerland

[73] Assignee: Oerlikon-Contraves AG, Switzerland

[21] Appl. No.: 730,682

[22] Filed: Oct. 11, 1996

[51] Int. Cl.[6] .................................................. G01S 13/78
[52] U.S. Cl. .................................................. 342/45; 367/2
[58] Field of Search .......................... 342/45, 50, 51; 367/2, 6, 128; 434/21; 359/159

[56] References Cited

U.S. PATENT DOCUMENTS

| | | | |
|---|---|---|---|
| 4,545,583 | 10/1985 | Pearman et al. | 273/311 |
| 4,899,039 | 2/1990 | Taylor et al. | 250/209 |
| 5,164,734 | 11/1992 | Fredericks et al. | 342/172 |
| 5,426,295 | 6/1995 | Parikh et al. | 250/227.1 |
| 5,447,436 | 9/1995 | Campagnuolo et al. | 434/11 |
| 5,479,408 | 12/1995 | Will | 370/94.1 |

FOREIGN PATENT DOCUMENTS

| | | |
|---|---|---|
| 504690 | 9/1992 | European Pat. Off. . |
| 2659136 | 9/1991 | France . |
| 4003960 | 8/1990 | Germany . |

*Primary Examiner*—Daniel T. Pihulic
*Attorney, Agent, or Firm*—Ostrolenk, Faber, Gerb & Soffen, LLP

[57] ABSTRACT

The harness comprises a plurality of elements, such as light detectors, a laser emitter and a master control unit. The elements are communicating by means of ultrasonic signals. Such signals provide a secure communication over a short distance while being impossible to detect from larger distances. Upon initialization of the harness, the master control unit initializes all elements to respond to a common identification code, which identification code can be updated automatically during later operation.

18 Claims, 6 Drawing Sheets

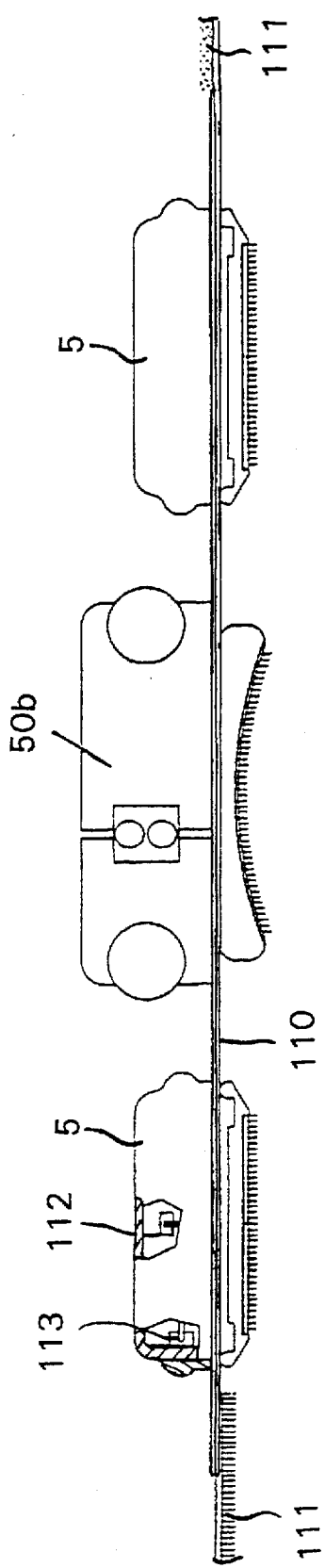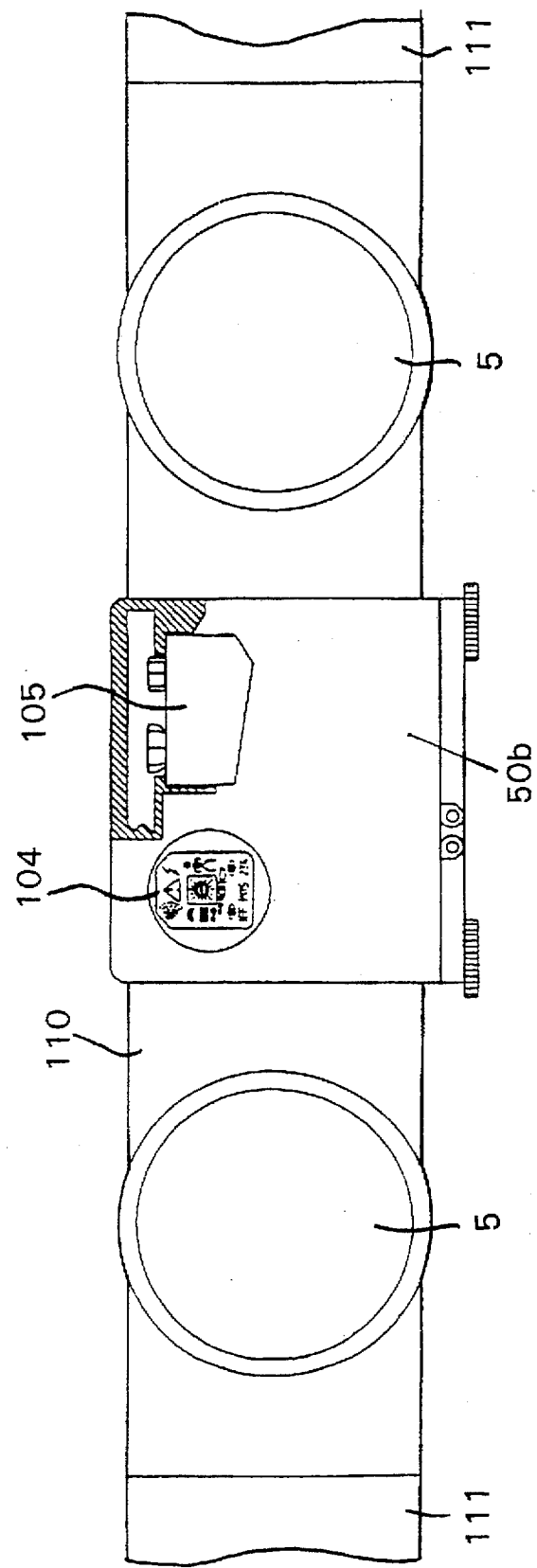

| header 140 | data 141 | CRC 142 |

COMBAT HARNESS

BACKGROUND OF THE INVENTION

1. Field of the Invention

The invention relates to a sensor harness, a combat simulation system and a method for operating a sensor harness.

A harness or a system of this type can e.g. be used for combat simulation and/or "Identification Friend or Foe" (IFF) systems. It usually comprises a plurality of sensors, such as light sensors, for the detection of laser radiation. Some components of the harness can e.g. also be mounted on a weapon or be carried in a pocket or on a piece of clothing.

2. Description of Related Art

In conventional embodiments, the individual components of the harness are communicating over wires. However, wires are cumbersome, especially when the harness consists of several parts, e.g. a body harness and a helmet harness. For such cases, inductive communication systems have been proposed, which are, however, expensive. They are also prone to be intercepted by enemy radio receivers, thereby giving away a soldier's position.

SUMMARY OF THE INVENTION

Hence it is a general object of the invention to provide a combat harness, a combat simulation system and a method of the types mentioned above that avoid these disadvantages by providing a reliable, safe and simple communication between the individual harness components.

Now, in order to implement these and still further objects of the invention, which will become more readily apparent as the description proceeds, the harness is manifested by the features that it comprises a plurality of intercommunicating electrical components, wherein at least part of said components comprise an ultrasonic emitter and a modulator for emitting data communication signals and wherein at least part of said components comprise an ultrasonic receiver and demodulator for receiving said data communication signals.

The combat simulation system is manifested by the features that it comprises a plurality of combat harnesses, each combat harness comprising a plurality of intercommunicating electrical components, wherein at least part of said components comprise an ultrasonic emitter and a modulator for emitting data communication signals and wherein at least part of said components comprise an ultrasonic receiver and demodulator for receiving said data communication signals.

The method for operating a combat harness comprising a plurality of intercommunicating electrical components is manifested by the steps of emitting an ultrasonic data communication signal from at least a first of said components and receiving said ultrasonic data communication signal with at least a second of said components.

Ultrasonic signals, i.e. sound signals with a frequency higher than approximately 20 kHz, are difficult to detect from a distance, i.e. they are not exposed to enemy detection. Also, ultrasonic emitters and sensors are rugged and simple components, which reduces the cost of the harness.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 4 is a side view of the arm harness, FIG. 5 is a top view of the arm harness.

DESCRIPTION OF THE PREFERRED EMBODIMENTS

A combat harness as described below may below may be used in the system disclosed in the U.S. application Ser. No. 08/731,365 filed on the same day as this application by the same inventor and entitled "COMBAT COMMUNICATION DEVICE".

Figure 1:
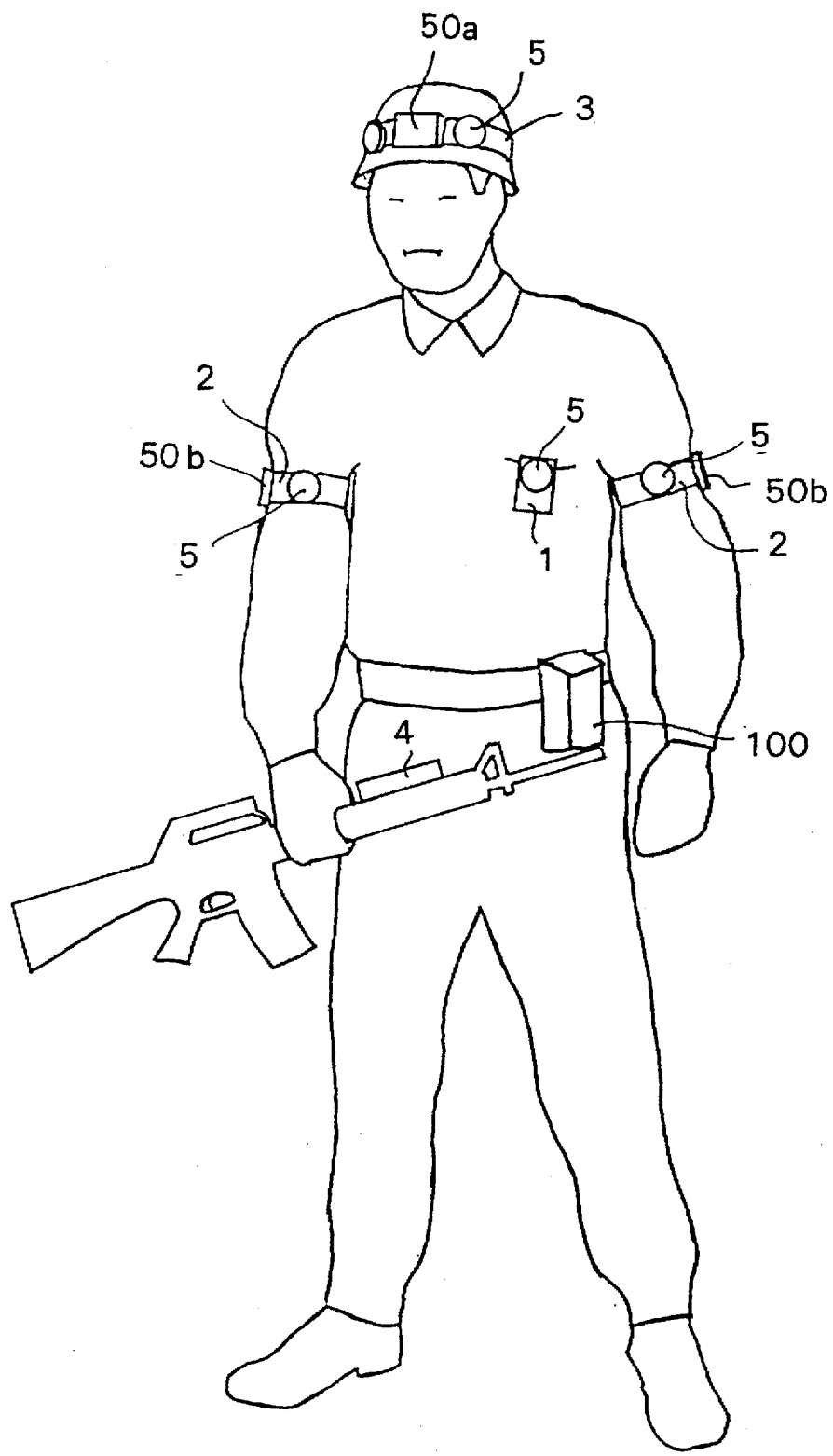
FIG. 1 shows a soldier wearing an embodiment of the harness of the present invention.

The basic design of a preferred embodiment of a harness according to the present invention is shown in FIG. 1. Its main components are: A master control unit 1, two arm harnesses 2, a helmet harness 3 and a laser assembly 4. Master control unit 1, arm harnesses 2 and helmet harness 3 are each equipped with one or more light detectors 5 sensitive at the wavelength of the light emitted by the laser assembly 4. In the present embodiment, each arm harness 2 is equipped with two detectors arranged on opposite sides of the arm, and helmet harness 3 carries four detectors, each of which covers an area of approximately 90 degrees.

Since each component of the harness can be fastened individually to the extremities of the body, i.e. arms, legs, head (or helmet), but not around the trunk, i.e. the upper body and chest, putting the harness on and taking it off is easy even when a soldier is carrying other equipment, such as a backpack.

The present harness can operate as an IFF system and as a combat simulation system. When being used as an IFF system, one soldier aims his weapon at a potential target and then actuates laser assembly 4, which emits a modulated laser beam. The target (another soldier) detects the laser signal and sends a reply that proofs its identity. This reply is received by the first soldier's harness or laser assembly, respectively, and indicates that the target is a "friend". In the absence of a suitable reply, the first soldier's harness or laser assembly, respectively, decides that the target must be a "foe".

The present harness can also operate as a combat simulation system. In this case, a soldier also aims his weapon at a target (a second soldier wearing a harness) and then actuates laser assembly 4. If the laser beam hits detectors 5 of the second soldier's harness, it displays a "hit".

The laser assembly can also be used independently as an aiming aid as it is known to a person skilled in the art.

The harness of FIG. 1 comprises several components, namely the master control unit 1 with its detector the helmet harness (helmet component) comprising four detectors 5 and a helmet control circuit 50a.

two arm harnesses (arm components), each comprising two detectors 5 and an arm control circuit 50b, laser assembly 4, which is not worn on the soldier's body but which is also considered to be one of the harness components within this disclosure because it is carried by the soldier and interacts with the other components, additional components, such as a GPS module 100, ear phones (not shown), etc.

In the following, we first discuss the mechanical design of some of these components, then the method of communication between them.

Figure 2:
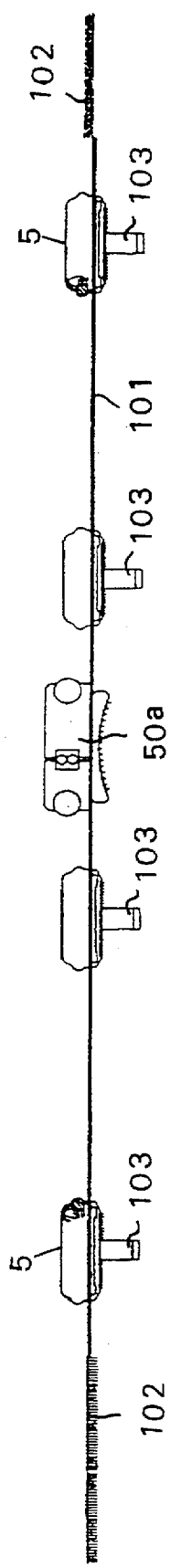
FIG. 2 is a side view of the helmet harness.
Figure 3:
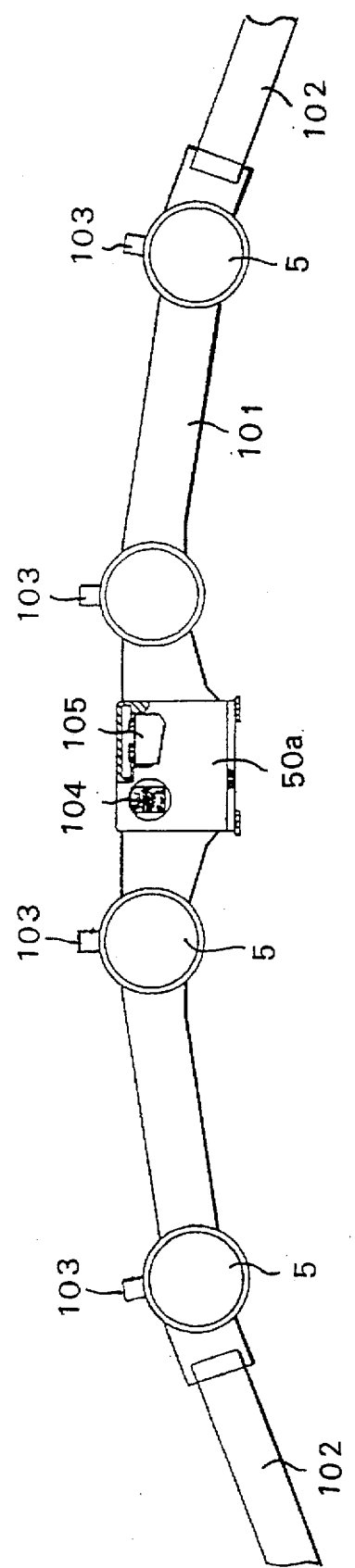
FIG. 3 is a top view of the helmet harness.

FIGS. 2 and 3 show helmet harness 3. It comprises a belt 101 with Velcro fastenings 102 at its ends. Four infrared detectors 5 are arranged along belt 101. A wedge 103 behind each detector 5 ensures a vertical position of its outer surface on the curved helmet. Helmet control circuit 50a fastened to the center portion of belt 101 comprises a display 104 and a battery 105.

FIGS. 4 and 5 show arm harness 2. It also comprises a belt 110 with Velcro fastening 111. Belt 110 carries two detectors 5 and arm control circuit 50b. Each detector 5 comprises a central light sensitive diode 112 and lateral light sensitive diodes 113. Arm control circuit 50b has the same design as helmet control circuit 50a and also contains a display 104 and a battery 105.

Figure 7:
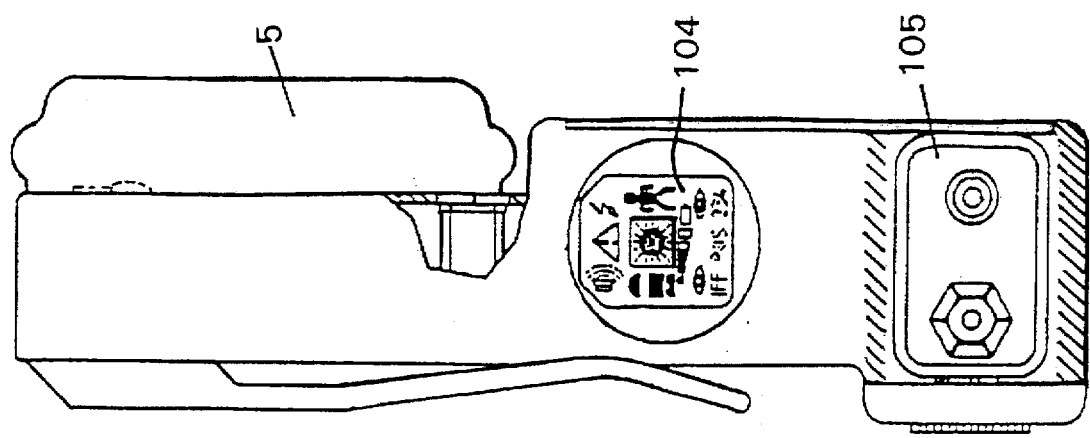
FIG. 7 is a side view of the master control unit.
Figure 6:
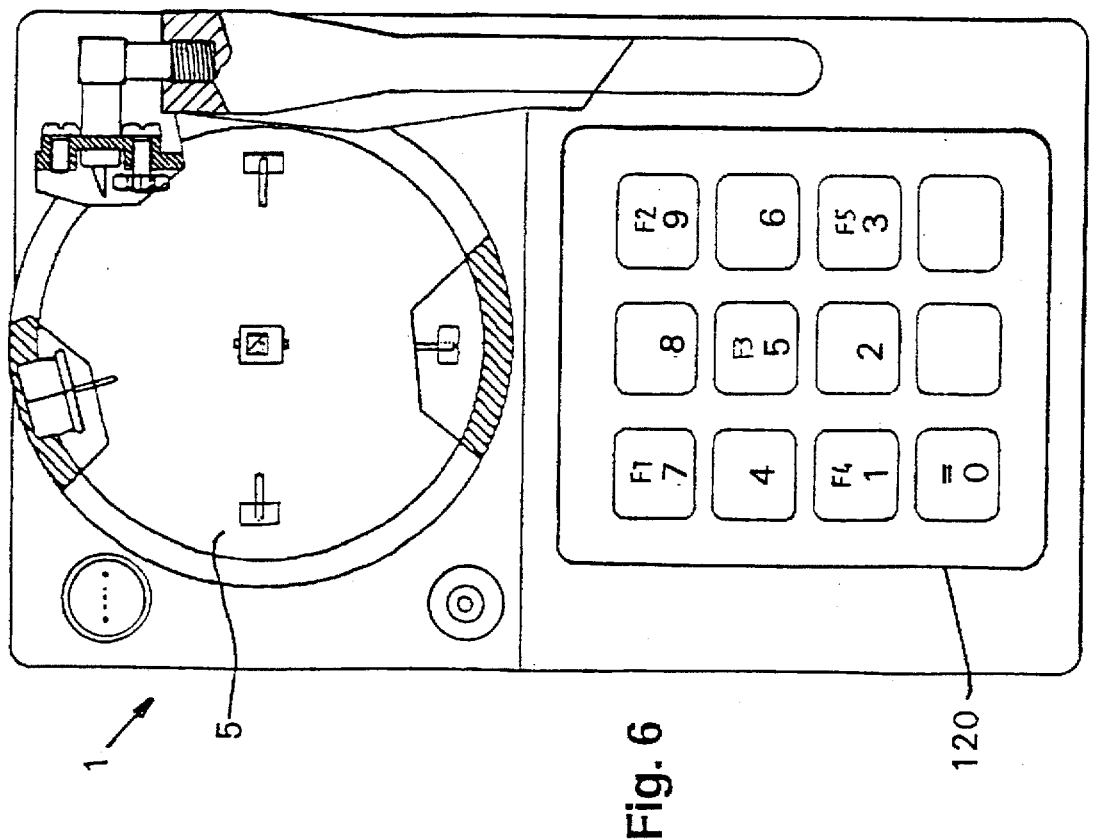
FIG. 6 is a front view of the master control unit.

FIGS. 6 and 7 show master control unit 1. Master control unit 1 is also equipped with a detector 5. It comprises a key pad 120, a display 104 and a battery 105. A clipping arm 122 can be used for attaching the unit to a breast pocket, belt or other piece of equipment.

The communication between the individual components of the harness is based on ultrasonic signals. For this purpose, one of the components, master control unit 1, is acting as a master. The other components are acting as slave units.

Figure 8:
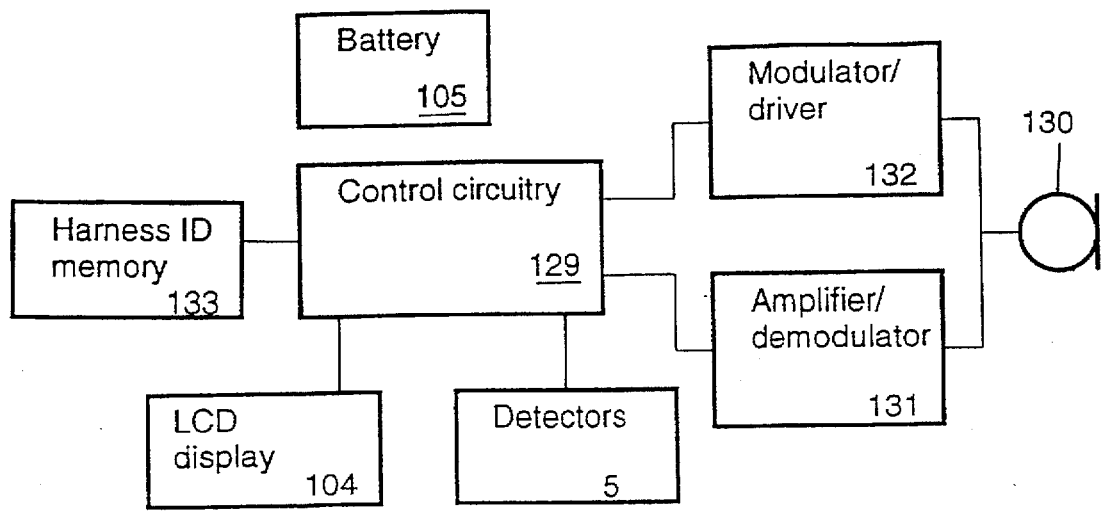
FIG. 8 is a block diagram of a slave unit.

FIG. 8 shows the block diagram of a slave unit, namely of the helmet or arm harness. The block diagram of other slave units, such as a GPS module, may contain other or additional elements.

The slave unit is controlled by a control circuitry 129, e.g. comprising a microprocessor, RAM and ROM, such as it is known to a person skilled in the art. Control circuitry 129 monitors the signals from light detectors 5 and displays data on LCD display 104. All elements of the slave unit are powered by battery 105.

An ultrasonic transducer 130 is provided for data communication. Transducer 130 is e.g. a piezoelectric element that can be operated as a emitter as well as a receiver of ultrasonic waves. In the present embodiment it is working at 40 kHz.

Signals coming from transducer 130 are processed in an amplifier/demodulator 131 and fed to control circuitry 129. Signals to be emitted from the slave unit are led through a modulator/driver 132 and sent to transducer 130.

Signals emitted and received can be encoded by any method know to a person skilled in the art, such as by amplitude, frequency or pulse modulation.

As it will be explained in detail below, each slave unit also comprises a memory 133 for storing a harness ID, a unique identification code attributed to each harness. Harness ID memory 133 can be part of the RAM of control circuitry 129.

Figure 9:
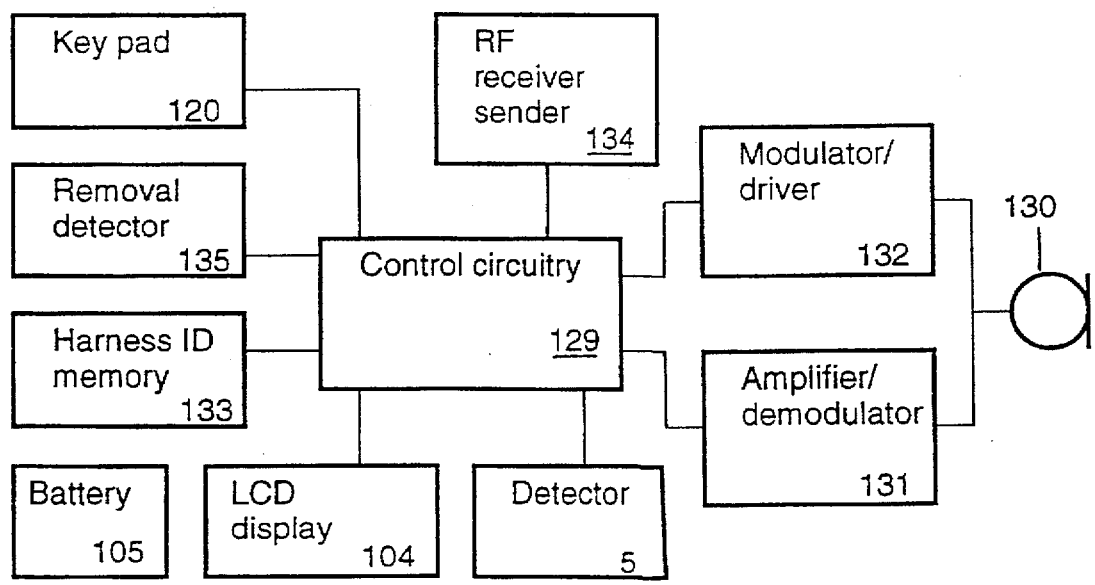
FIG. 9 is a block diagram of a master control unit.

FIG. 9 shows a block diagram of master control unit 1. It also comprises a control circuitry 129 monitoring detector 5 and driving LCD display 104, a battery 105, and ultrasonic transducer 130 with amplifier/demodulator 131 and modulator/driver 132, and a harness ID memory 133 (which can either be in ROM or RAM). In addition to this, it contains the following elements:

a radio frequency (RF) sender/receiver 134 for communication with the outside world;

key pad 120 for inputting data and controlling the operation of the harness;

a removal detector 135 for detecting if master control unit 1 was removed from its wearer; this detector can e.g. be provided with sensors measuring humidity, temperature, pulse, vocal emissions or other parameters indicative of the proximity of its wearer's body, or it can contain mechanical detectors indicating an opening of the master control unit's fastenings or clip, etc.

Figures 10, 11:
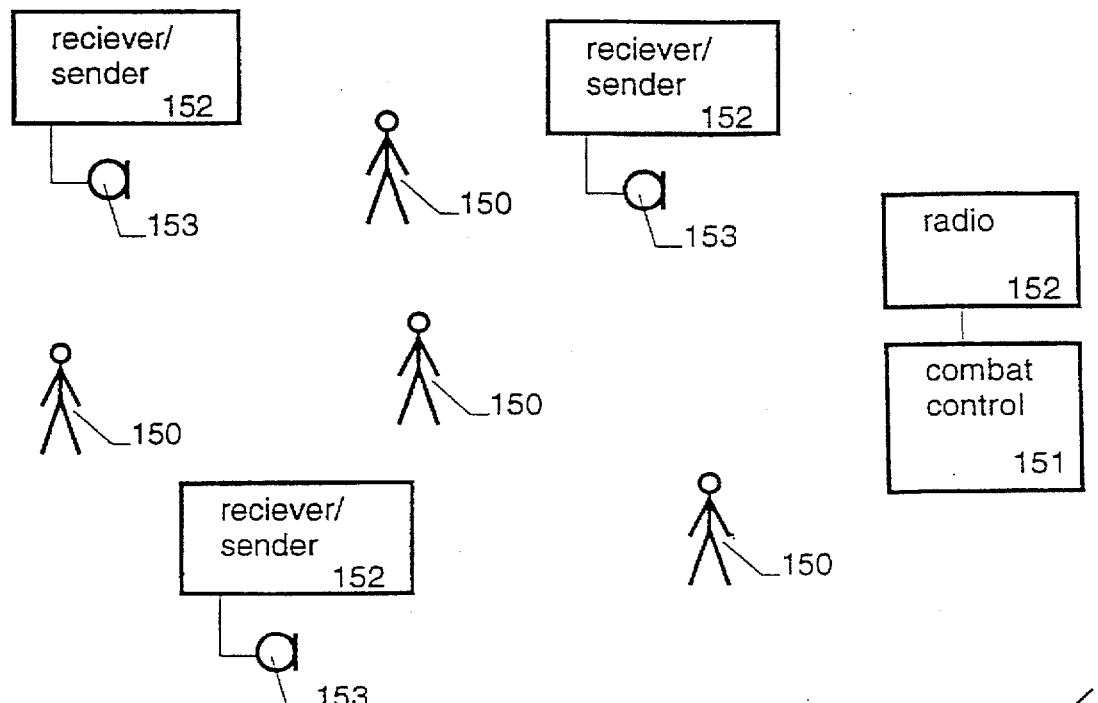
FIG. 10 shows a data packet exchanged between the components of the harness, and FIG. 11 a complete combat simulation or control system.

Data communication between the individual components of the harness can e.g. be implemented by using data packets such as the one shown in FIG. 10. Each data packet starts with a header 140, followed by a data block 141 and a suitable checksum 142.

For normal communication, standard messages with a header 140 containing the harness ID of the present harness are emitted. Upon receipt of the message, each component compares this ID to the one stored in harness ID memory 133. If the two identification codes match, the following data block 141 is analyzed. Data-block 141 e.g. contains information about the state of the detector(s), commands to be displayed on LCD display 104, etc.

Such standard messages can be emitted by each of the components of the harness. They are received and analyzed by all other components.

In addition to this, master control unit 1 can also emit administrative messages. One such administrative message is the initialization message.

An initialization message is usually emitted once after a user has put on the harness, entered a harness identification code to be stored in harness ID memory 133, and pressed an "initialization" key on key pad 120. The initialization message contains a special initialization code in header 140. When a slave component receives a message with this initialization code, it parses data block 141, which contains the harness ID of the master control unit. This harness ID is copied to the harness ID of the receiving slave unit. Hence, the initialization message is used for setting the harness ID of all slave units located within the range of transducer 130 of the master control unit. After having put on his harness, a soldier therefore is to go to a place sufficiently far from any other soldier wearing a harness and press the initialization key on his master control unit 1. This initializes all components of his harness.

A second administrative message emitted from the master control unit is the synchronization message. Synchronization messages are emitted in regular time intervals. Each synchronization message contains a special synchronization code in its header 140 and the harness ID of the master control unit in its data block 141. Each slave unit controls if it receives at least one synchronization message containing its harness ID within a given time interval. If not, it assumes that it has been removed from its master control unit. It then starts scanning for any synchronization message and, once it receives one, will extract the harness ID from data block 141 and set its harness ID memory to this new harness ID. This makes it possible to exchange harness components. When a harness component is moved from one soldier to the other, it will automatically synchronize its identification code with the harness components around it.

Normal standard messages are used for exchanging data between the components of the harness. They e.g. transport the following information:

laser signals received on one of the detectors 5;
the battery state of the individual components;

information to be displayed on the LCD display 104 of each component—in a preferred embodiment, each display 104 of each component shows the same information;

position information from GPS unit 100;

IFF or simulation status information from laser assembly 4.

Other types of information can be exchanged as well.

In the present embodiment shown in FIG. 1, master control unit 1 is the master, while all other components are slave units. It is, however, possible to design any one of the other components to be the master control unit. Also, the number of components can vary and be larger or smaller than shown here.

FIG. 11 shows a complete combat or simulation system used for monitoring or controlling a plurality of soldiers 150 from a combat control 151.

Combat control 151 is equipped with a radio receiver/sender 152, which provides data communication to the radio receiver/sender 134 of the master control units 1 of the soldiers' harnesses. This link is used by the master control units for transmitting status information on each soldier (such as his position, help signals, detected hits, etc.). Combat control 151 can use this link for transmitting commands, such as "retreat" or "attack".

In addition to this, there can be a plurality of stationary or movable (e.g. vehicle based) receivers/senders 152, which are linked to combat control 151 via cable or radio. Each such receiver/sender 152 comprises one or more ultrasonic transducers 153, which can be used for communication with the transducers 130 of the harnesses. Receivers/senders 152 can e.g. detect the presence of soldiers in a given area (for example in a room), thereby providing further information for combat control 151. They can also be used for transmitting data from combat control 151 to all soldiers in the given area.

Receivers/senders 152 can also be coupled to automatic door openers, room illumination, video monitoring, etc. For such tasks, they need not necessarily be connected to combat control 151.

The present invention can also be combined with any existing combat simulation and communication systems.

While there is shown and described a presently preferred embodiment of the invention, it is to be distinctly understood that the invention is not limited thereto but may be otherwise variously embodied and practiced within the scope of the following claims.

I claim:

1. A combat harness comprising a plurality of intercommunicating electrical components, wherein at least part of said components comprise an ultrasonic emitter and a modulator for emitting data communication signals and wherein at least part of said components comprise an ultrasonic receiver and demodulator for receiving said data communication signals.

2. The combat harness of claim 1 comprising a plurality of harness elements for being individually fastened to the human body and for carrying at least one of said components.

3. The combat harness of claim 2 further comprising at least one arm harness, said arm harness comprising a belt and fastening means for fastening said belt around a human arm.

4. The combat harness of claim 1 wherein each of said components comprises one of said ultrasonic emitters and one of said ultrasonic receivers.

5. The combat harness of claim 1 wherein one of said components is a master control unit and the remaining components are slave units, wherein said master control unit comprises a master memory for storing a harness identification code and master control circuitry for transmitting said identification code to said slave units by means of said data communication signals.

6. The combat harness of claim 5 wherein each of said slave units comprises a slave memory for storing said identification code from said master control unit and slave control circuitry for comparing incoming messages to said identification code stored in said slave memory.

7. The combat harness of claim 1 wherein a plurality of said components comprises a display.

8. The combat harness of claim 7 wherein at least part of data displayed on said displays is displayed on more than one of said displays simultaneously.

9. The combat harness of claim 1 wherein at least one of said components comprises a means for detecting a removal of at least part of said harness from the human body.

10. The combat harness of claim 1 comprising a plurality of straps for fastening said components to a wearer, wherein said straps are designed for being fastened around the extremities but not around the trunk of the wearer.

11. A combat simulation system comprising a plurality of combat harnesses, each combat harness comprising a plurality of intercommunicating electrical components, wherein at least part of said components comprise an ultrasonic emitter and a modulator for emitting data communication signals and wherein at least part of said components comprise an ultrasonic receiver and demodulator for receiving said data communication signals.

12. The combat simulation system of claim 11 further comprising stationary ultrasonic receivers for communicating with said combat harnesses.

13. The combat simulation system of claim 11 further comprising stationary ultrasonic transmitters for communicating with said combat harnesses.

14. A method for operating a combat harness comprising a plurality of intercommunicating electrical components, said method comprising the steps of emitting an ultrasonic data communication signal from at least a first of said components and receiving said ultrasonic data communication signal with at least a second of said components.

15. The method of claim 14 further comprising a step of attributing a common harness identification code to said components.

16. The method of claim 15 wherein one of said elements is a master control unit and the other elements are slave units and wherein in said step of attributing a common harness identification code said identification code is transmitted from said master control unit to said slave units.

17. The method of claim 16 wherein said common identification code is repeatedly transmitted from said master control unit to said slave units.

18. The method of claim 17 wherein when a slave unit does not receive said common identification code from said master control unit within a given time interval, said slave unit stores a next received identification code as said common identification code.

* * * * *